United States Patent
Hui

(10) Patent No.: US 9,930,403 B2
(45) Date of Patent: Mar. 27, 2018

(54) DATA STREAM PROCESSING APPARATUS

(71) Applicant: MediaTek Singapore Pte. Ltd., Singapore (SG)

(72) Inventor: Guangjun Hui, Guangdong (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/779,424

(22) PCT Filed: May 20, 2013

(86) PCT No.: PCT/CN2013/075904
§ 371 (c)(1),
(2) Date: Sep. 23, 2015

(87) PCT Pub. No.: WO2014/186934
PCT Pub. Date: Nov. 27, 2014

(65) Prior Publication Data
US 2016/0057487 A1 Feb. 25, 2016

(51) Int. Cl.
*H04N 7/173* (2011.01)
*H04N 21/44* (2011.01)
(Continued)

(52) U.S. Cl.
CPC ..... *H04N 21/44004* (2013.01); *H04N 21/434* (2013.01); *H04N 21/47217* (2013.01)

(58) Field of Classification Search
CPC combination set(s) only.
See application file for complete search history.

(56) References Cited

U.S. PATENT DOCUMENTS 6,091,772 A 7/2000 Anderson et al.
8,331,772 B1 * 12/2012 Zdepski ................. H04N 5/783
386/205

(Continued)

FOREIGN PATENT DOCUMENTS

CN 101980541 2/2011
EP 1 223 756 A2 7/2002

OTHER PUBLICATIONS

International Search Report dated Feb. 27, 2014, issued in PCT/CN2013/075904.

*Primary Examiner* — Alexander Gee
(74) *Attorney, Agent, or Firm* — McClure, Qualey & Rodack, LLP

(57) ABSTRACT

An embodiment of the invention provides a data stream processing apparatus. The data stream processing apparatus includes a demultiplexer, a data processor and a backward buffer. The demultiplexer accesses and demultiplexes a multimedia data stream and output a first data stream. The multimedia data stream includes a plurality of data units. The data processor receives and processes the first data stream. The backward buffer stores a first portion of multimedia data stream, wherein the data units of the first portion of the multimedia data stream has been accessed by the demultiplexer, but has not been processed by the data processor. If a user demands changing a playback content of the multimedia data stream, the data units stored in the backward buffer are re-transmitted to the demultiplexer for filtering out a second data stream corresponding to the demand.

11 Claims, 6 Drawing Sheets

(51) Int. Cl.
*H04N 21/434* (2011.01)
*H04N 21/472* (2011.01)

(56) References Cited

U.S. PATENT DOCUMENTS

| | | | |
|---|---|---|---|
| 2004/0066765 A1* | 4/2004 | Segal | H04J 3/1682 370/335 |
| 2005/0015794 A1* | 1/2005 | Roelens | H04N 21/4147 725/18 |
| 2005/0191041 A1 | 9/2005 | Braun et al. | |
| 2006/0104305 A1 | 5/2006 | Yoshida et al. | |
| 2006/0268354 A1 | 11/2006 | Rodgers et al. | |
| 2006/0290808 A1 | 12/2006 | Choi et al. | |
| 2007/0093263 A1 | 4/2007 | Song et al. | |
| 2010/0328527 A1* | 12/2010 | Brandsma | H04N 21/4384 348/388.1 |

* cited by examiner ion. This description is made
DATA STREAM PROCESSING APPARATUS

CROSS REFERENCE TO RELATED APPLICATIONS

This application is a National Phase of PCT Application No. PCT/CN2013/075904, filed on May 20, 2013, the entire contents of which are hereby incorporated by reference.

TECHNICAL FIELD

The present invention relates to a data stream processing apparatus, and more particularly to a data stream processing apparatus with a buffer device.

BACKGROUND

Multimedia system has been widely used in entertainment technology recently. Users utilize electronic devices to receive, decode and play decoded received multimedia data. Multimedia data may contain different media content, such as video content, audio content, teletext, close caption or others. An elementary stream is a generic term for a sequence of coded video, coded audio, coded graphics or other access units that can be correctly decoded by a hypothetical decoder. The elementary stream is divided into packets to form a packetized elementary stream (PES). A packet starts with a header, followed by the content of the packet (payload) and the descriptor. Packetization provides protection and flexibility for transmitting multimedia data stream across the different networks.

SUMMARY

An embodiment of the invention provides a data stream processing apparatus. The data stream processing apparatus includes a buffer device, a demultiplexer, a data processor and a controller. The buffer device buffers a multimedia data stream. The multimedia data stream comprises a plurality of data units. The demultiplexer accesses the data units of the multimedia data stream in the buffer device, generates an index data corresponding to the data units of the multimedia data stream, and filters the data units of the multimedia data stream to output a first output data stream. The data processor receives and processes the first output data stream. The controller receives a demand of changing playback content, generates a control signal, and determines a DEMUX pointer and a decoding pointer according to the index data, so as to determine a backward buffer section of the buffer device according to the DEMUX pointer and the decoding pointer. The demultiplexer, according to the control signal, re-accesses and filters the data units stored in the backward buffer section to output a second output data stream. And, the data processor receives and processes the second output data stream.

Another embodiment of the invention provides a data stream processing apparatus. The data stream processing apparatus includes a demultiplexer, a data processor and a backward buffer. The demultiplexer accesses and demultiplexes a multimedia data stream and output a first data stream. The multimedia data stream includes a plurality of data units. The data processor receives and processes the first data stream. The backward buffer stores a first portion of multimedia data stream, wherein the data units of the first portion of the multimedia data stream has been accessed by the demultiplexer, but has not been processed by the data processor. If a user demands changing a playback content of the multimedia data stream, the data units stored in the backward buffer are re-transmitted to the demultiplexer for filtering out a second data stream corresponding to the demand Yet, in another embodiment of the invention provides a data stream processing method. The method includes: (a) buffering a multimedia data stream in a buffer, the multimedia data stream comprises a plurality of data units; (b) accessing the data units of the multimedia data stream in the buffer, and generating an index data corresponding to the data units of the multimedia data stream; (c) determining whether a demand of changing playback content is received; (d) if the determination step on step (c) is positive, determining a DEMUX pointer and a decoding pointer according to the index data, so as to determine a backward buffer section of the buffer according to the DEMUX pointer and the decoding pointer; and (e) re-accessing the data units stored in the backward buffer section of the buffer.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
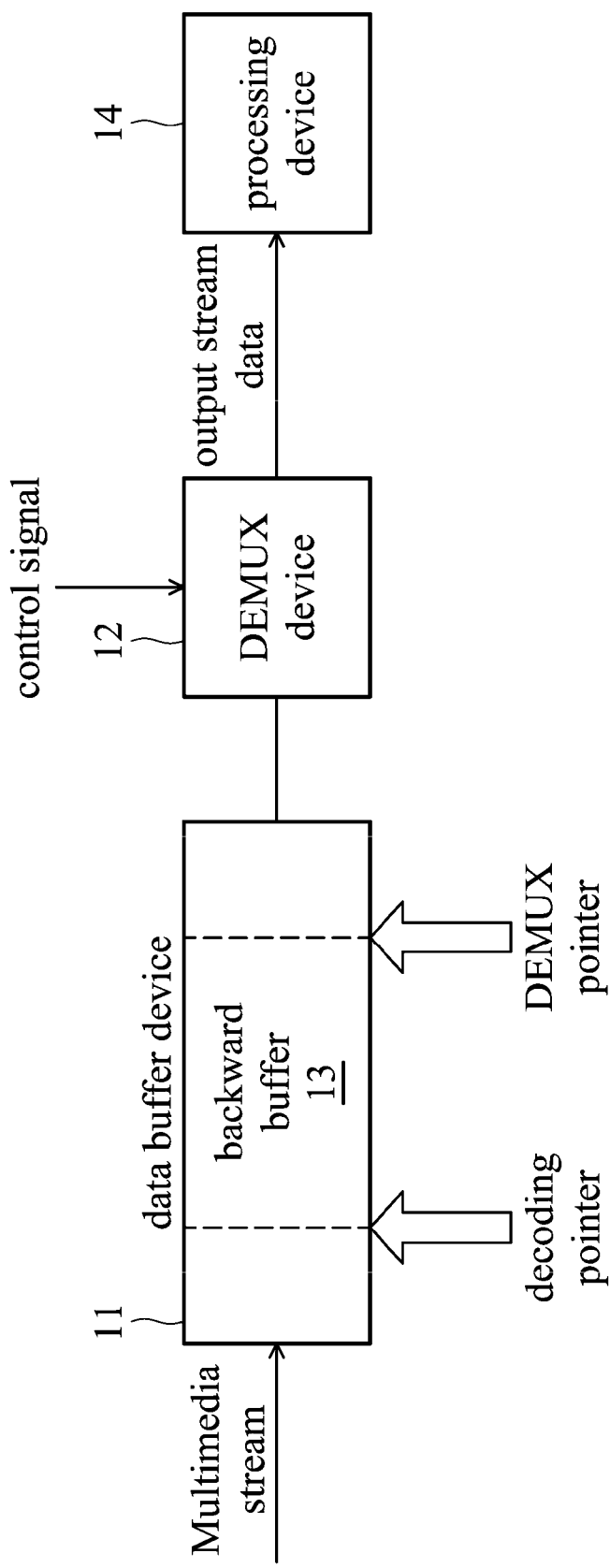
FIG. 1 is a schematic diagram showing a stream buffer apparatus for smoothly transmitting various data streams to a processing device according to an embodiment of the invention.

FIG. 1 is a schematic diagram showing a stream buffer apparatus for smoothly transmitting various data streams to a processing device according to an embodiment of the invention. The stream buffer apparatus comprises a data buffer device 11, a DEMUX device 12 and a data processing device 14. The data buffer device 11 stores various multimedia streams, e.g. video streams, audio streams, or information data stream. The data buffer device 11 includes a backward buffer section 13. Each of the multimedia streams contains a plurality of data units. The data unit may be a chunk, pack, packet or block. The DEMUX device 12 is used for de-multiplexing the buffered multimedia streams stored in a data buffer device 11. The DEMUX device 12 accesses the buffered multimedia streams from the data buffer device 11, filters the received multimedia streams data unit by data unit and transmits output stream data to the data processing device 14 according to a control signal. The output stream data may include a complete output data unit or output data bits which are a portion of the complete data unit. The data processing device 14 processes the output stream data.

In this embodiment, the DEMUX device 12 receives and filters the buffered multimedia streams from the data buffer device 11 and outputs the output stream data according to the demands of the data processing device 14. For example, the multimedia streams contains a video data stream, a first audio data stream with the 2.1 channel sound format, and a second audio data stream with the 5.1 channel sound format. At the beginning, the data processing device 14 needs only the video data stream and the first audio data stream, thus, the DEMUX device 12 filters the multimedia streams and outputs the video data stream and the first audio data stream to the data processing device 14. Once a user demands an audio change to select the 5.1 channel sound format via a remote control (not shown in FIG. 1). The DEMUX device 12 will receives a control signal. Then the DEMUX device 12 filters the multimedia stream according to the control signal and the DEMUX device 12 outputs the video data stream and the second audio stream to the data processing device 14 for further processing. In one embodiment, the output stream data may further include some other data stream, e.g. PSIP data packet containing subtitle information defined in ATSC standard. However, the detail of the PSIP data packet will not be discussed hereafter for the sake of brevity.

When the DEMUX device 12 processes a data packet of the multimedia stream, the DEMUX device 12 generates and adds an index data to the data packet, e.g. adding the index data into a reserved field of the data stream. The index data may contain a time stamp, a stream logic offset and buffer address information. The time stamp represents a time value corresponding to the data packet decoding time (DTS) and/or presenting time (PTS). The stream logic offset represents an offset value base on the first data packet of the multimedia stream. The buffer address information represents the buffer address of the data buffer device 11 for storing the data.

The data buffer device 11 may be implemented with a ring buffer structure. In one embodiment, the buffer area for storing a data unit, e.g. packet, of the multimedia stream which has been processed by the processing device 14 may be set to be free or available so as to be able to store a new received data unit. Thus, the data unit of the multimedia stream which has been processed by the DEMUX device 12 could be kept in the data buffer device 11 for a period of time. The data buffer device 11 includes a backward buffer section which is determined by a DEMUX pointer. The DEMUX pointer represents a first buffer address where a first data unit of the multimedia is currently processed by the DEMUX device 12. The buffer area for storing the data units which have been processed by the DEMUX device 12 is determined as the backward buffer section. The decoding pointer represents a second buffer address of the data buffer device 11 where stores a second data unit of the multimedia stream. And the second data unit is currently processed by the data processing device 14. With the index data, the stream buffer apparatus could figure out the DEMUX pointer and decoding pointer from the index data in the first data packet and the second data picket respectively. Therefore, the location and the size of the backward buffer section 13 are dynamically changed as time goes on and are able to be determined according to the decoding pointer and the DEMUX pointer.

Since the data unit could be kept in the data buffer device 11 for a period of time, when the user changes the audio settings to play a different audio stream, e.g. the audio stream with 5.1 channel sound format, the DEMUX device 12 according to the control signal re-access the data stored in the backward buffer section 13 so that the video data stream and the second audio data stream will be filtered and outputted to the data processing device. With such re-accessing operation, the user demanded audio change operation will be performed quickly and smoothly with a shorter transition time so as to improve the user experience.

Figure 2:
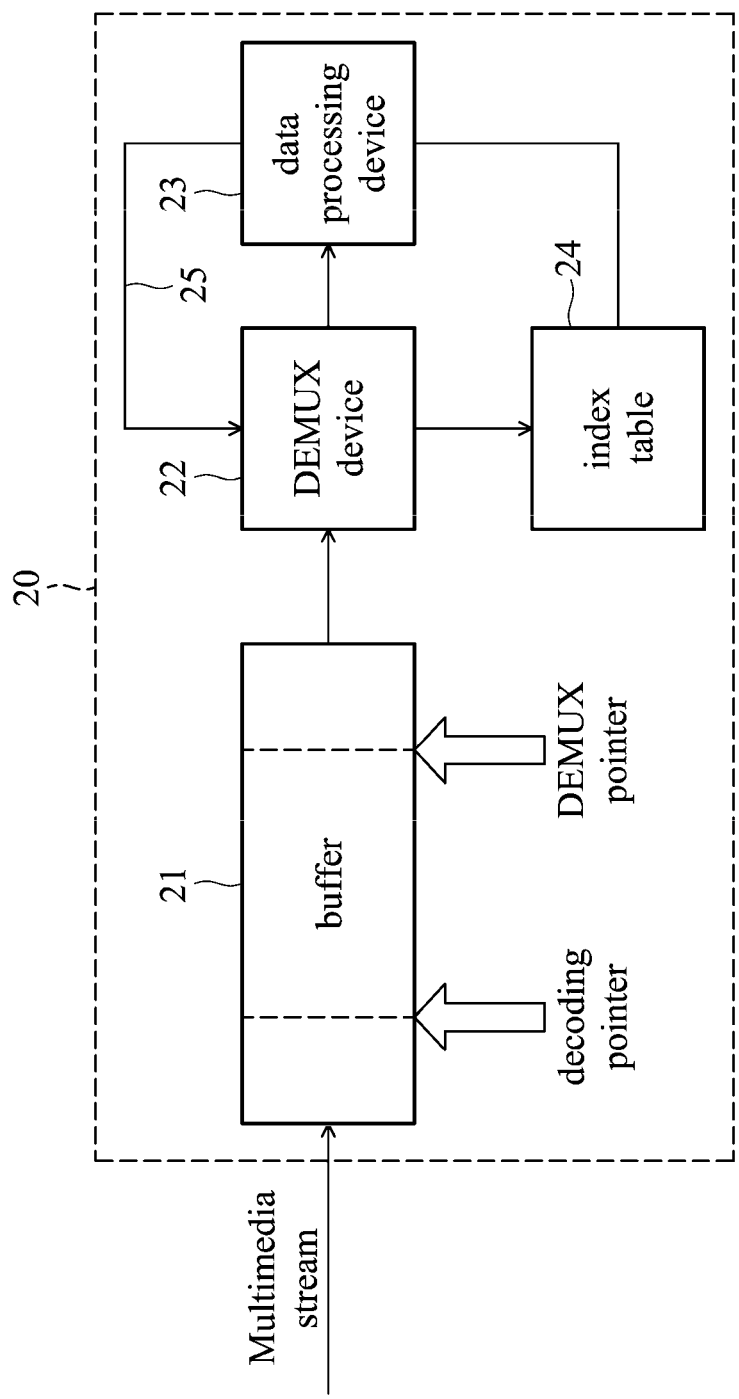
FIG. 2 is a schematic diagram of a data stream processing apparatus according to an embodiment of the invention.

FIG. 2 is a schematic diagram of a data stream processing apparatus according to an embodiment of the invention. The data stream processing apparatus 20 can be embodied in a connected TV, DVD player, Blu-ray Disk player, Set-top box or a computer capable of receiving and processing multimedia data stream. The data stream processing apparatus 20 comprises a buffer 21, a DEMUX device 22, a data processing device 23 and an index table 24. The buffer 21 receives and buffers multimedia data stream. The buffered multimedia data stream is then transmitted to the DEMUX device 22 and the DEMUX device 22 demultiplexes the buffered multimedia data stream to output at least one output stream data according to a control signal 25 issued from the data processing device 23. For example, assuming the multimedia data stream contains an audio data stream and a video data stream. The data processing device 23 contains an audio decoder and a video decoder for decoding the audio data stream and the video data stream respectively. In one embodiment, when the data processing device 23 starts to process the video data stream, the data processing device 23 issues the control signal 25 to the DEMUX device 22 so as to control the DEMUX device 22 filters the buffered multimedia data stream to output the video data stream to the data processing device 23 for further processing.

In this embodiment, the DEMUX device 22 generates and outputs an index data to its output stream data. The index data is then stored to an index table 24. The index data may contain a time stamp, a stream logic offset, and buffer address information. The time stamp represents a time value corresponding to the data packet decoding time (DTS) and/or presenting time (PTS). The DTS and PTS is a data filed in the multimedia stream and is well known to the person of the skill in the art, therefore it will not be discussed hereafter for the sake of brevity. The stream logic offset represents a offset value base on the first data packet of the multimedia stream. The buffer address information represents the buffer address for storing the data packet. With the index data, the data stream processing apparatus 20 could figure out the DEMUX pointer from the index data corresponding to the data packet which is currently processed by the DEMUX device 22. Further, the data stream processing apparatus 20 could figure out the decoding pointer from the index data corresponding to the data packet which is currently processed by the data processing device 23.

Assuming the data processing device 23 originally processes the video data stream, when the data processing device 23 stops processing the video data stream and starts to demand an audio data stream, the data processing device 23 transmits a control signal 25 to the DEMUX device 22. The DEMUX device 22, according to the DEMUX pointer and the decoding pointer, re-accesses the data packets stored in the backward buffer section. The DEMUX device 22 then demultiplexes the data packets stored in the backward buffer section again and outputs the requested audio data stream to the data processing device 23. As described in the previous paragraphs, a second buffer may be utilized to store the output data of the DEMUX device 22. When the data processing device 23 according to a user's demanding to change its playback contain, the data processing device 23 may transmit a buffer clean control signal to clear or to reset the second buffer.

Figure 3:
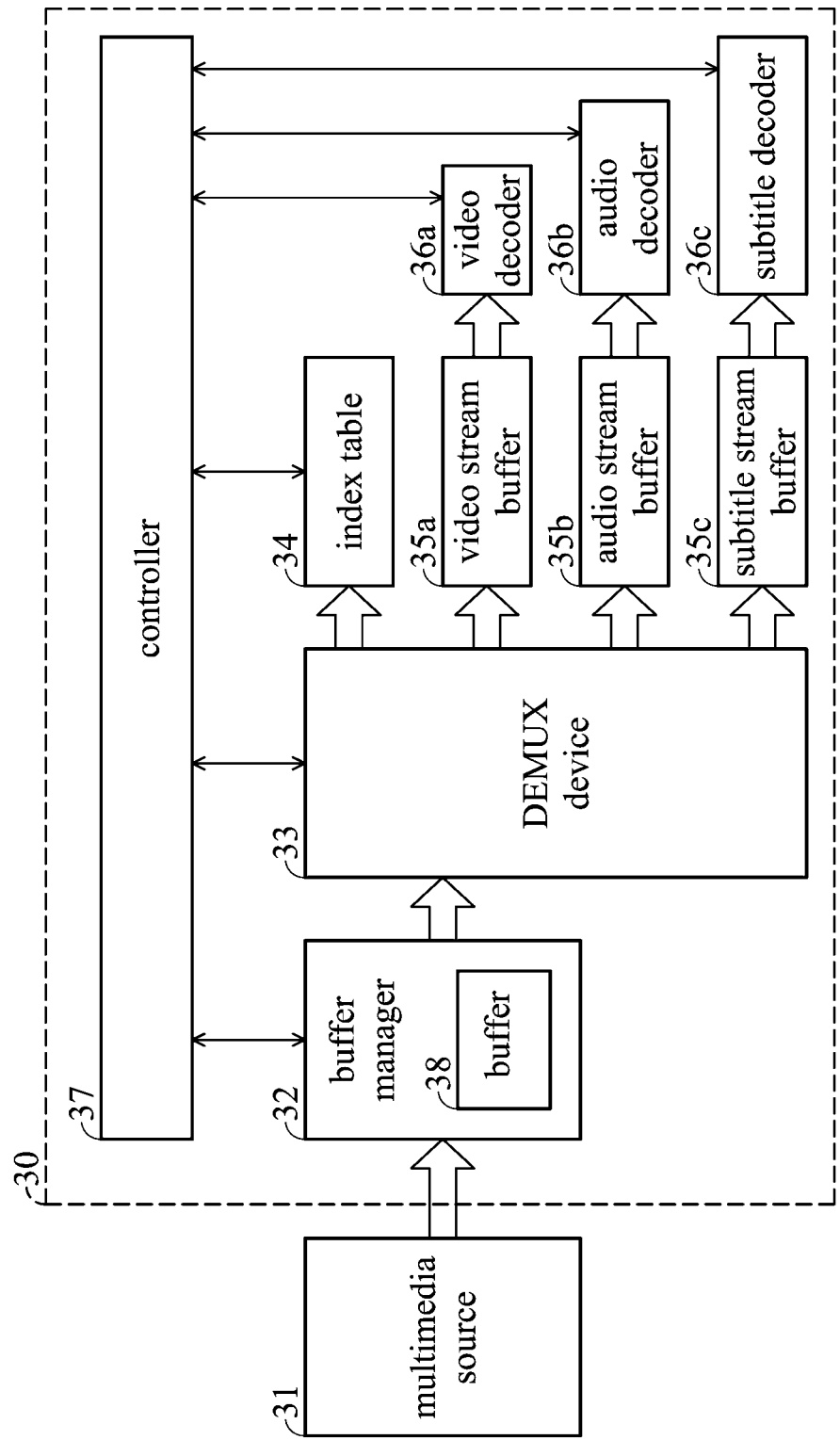
FIG. 3 is a schematic diagram of a data stream processing apparatus embodied in a multimedia processing apparatus, e.g. television, according to an embodiment of the invention.

FIG. 3 is a schematic diagram of a data stream processing apparatus embodied in a multimedia processing apparatus, e.g. television 30, according to an embodiment of the invention. The television 30 comprises a controller 37, a buffer manager 32, a DEMUX device 33, an index table 34, a video stream buffer 35a, an audio stream buffer 35b, a subtitle stream buffer 35c, a video decoder 36a, an audio decoder 36b, a subtitle decoder 36c, and a buffer 38. The multimedia source 31 may be a service provider of the internet, a multimedia player, a radio frequency transmitter for broadcasting a TV program or other multimedia source for providing multimedia stream data. The controller 37 controls the operations of the television 30. The buffer manager 32 receives the multimedia stream data from the multimedia source 31. Then, the buffer manager 32 is controlled by the controller 37 for storing the received multimedia stream data to the buffer 38. In more detail, the buffer 38 controlled by the buffer manager 32 to be implemented with a ring buffer structure, so that the buffer area for storing a data unit, e.g. packet, of the multimedia stream which has been processed by the video decoder 36a, the audio decoder 36b or the subtitle decoder 36c may be set to be free or available so as to be able to store a new received data unit. The buffer manager further is controlled by the controller 37 for transmitting data packets to the DEMUX device 33. The DEMUX device 33 filters the received data packets. The DENMUX device 33, according to a control signal issued from the controller 37, outputs the desired video data packet to the video stream buffer 35a, outputs the desired audio data packet to the audio stream buffer 35b, and outputs subtitle data packet to the subtitle stream buffer 35c. The video decoder 36a is controlled by the controller 37 accessing and decoding the video data packet stored in the video stream buffer 35a. The audio decoder 36b is controlled by the controller 37 accessing and decoding the audio data packet stored in the audio stream buffer 35b. Also, the subtitle decoder 36c is controlled by the controller 37 accessing and decoding the subtitle data packet stored in the subtitle stream buffer 35c. It is noted that the television 30 comprises many other elements which are not shown in FIG. 3, such as a display panel, a speaker or other control means. The function block diagram of FIG. 3 shows only the necessary elements for the data stream processing apparatus, and the invention is not limited thereto. In this embodiment, the multimedia data stream outputted by the multimedia sources 31 comprises a video data stream, a first subtitle data stream, a second subtitle data stream, a first audio data stream with the 2.1 channel and a second audio data stream with the 5.1 channel.

In this embodiment, the DEMUX device 33 generates and outputs an index data to its output stream data and stores the index data to an index table 34. The index data may contain a timestamp, a stream logic offset and buffer address information. The index table 34 records the relation among the index data, the buffered multimedia data stream and the output stream data of the DEMUX device 33. With the index data, the controller 37 could figure out the decoding pointer from the index data corresponding to the video data packet which is currently processed by the video decoder 36a. Further the controller 37 could figure out the DEMUX pointer from the index data corresponding to the data packet which is currently processed by the DEMUX device 33.

Therefore, the location and the size of the backward buffer section of the buffer 38 are dynamically changed as the time goes on and are able to be determined according to the decoding pointer and the DEMUX pointer.

In one embodiment, at the beginning, the controller 37 controls the DEMUX device 33 to output the first audio data stream to the audio stream buffer 35b, and controls the audio decoder 36b decodes the first audio data stream. If the television 30 receives a remote control signal from a user to change the audio output from a first audio data stream with the 2.1 channel to a second audio data stream with the 5.1 channel, the controller 37 searches the index table 34 to figure out the DEMUX pointer and the decoding pointer so as to determine the area and location of the backward buffer section of the buffer 38. Then the controller issues control signals to control the buffer manager 32, the DEMUX device 33, and the audio decoder 36b. The buffer manager 32, according to the control signal issued from the controller 37, retransmits data packets within the backward buffer section to the DEMUX device 33. The DEMUX, according to the control signal issued from the controller 37, filters and outputs the second audio data stream with the 5.1 channel to the audio stream buffer 35b for further processing by the audio decoder 36b.

In another embodiment, when the controller 37 transmits a control signal to the DEMUX device 33, the controller 37 clears or resets the audio stream buffer 35b. In this embodiment, the DEMUX device 33 also outputs and transmits the re-demultiplexed video data stream and the subtitle data stream to the video stream buffer 35a and subtitle stream buffer 35c, respectively. In another embodiment, when the DEMUX device receives the data packets within the backward buffer section of the buffer 38, the DEMUX device 33 outputs only the newly desired data packet, e.g. second audio data stream, for further processing by the downstream decoder, e.g. the audio decoder 36b. When the data stored in the backward buffer section has been demultiplexed, the buffer manager 32 transmits the data stored in the buffer area behind the buffer address pointed by the DEMUX pointer to the DEMUX device 33.

Although the embodiment of FIG. 3 describes the situation of audio output switching, the invention is not limited thereto. The apparatus shown in FIG. 3 can also be applied to subtitle switching.

As described previously, in another embodiment, the multimedia data stream comprises the first subtitle data stream, e.g. in Chinese Language, and the second subtitle data stream, e.g. in English language, respectively. At the beginning, the user wants to watch Chinese language subtitles, thus the controller 37 controls the DEMUX device 33 to output the first subtitle data stream to the subtitle stream buffer 35c, and controls the subtitle decoder 36c decodes the first subtitle data stream. When a user demands a subtitle change to watch English language subtitles, the user transmits a remote control signal to the television 30 via a remote control. The controller 37 accordingly searches the index table 34 to figure out the DEMUX pointer and the decoding pointer so as to determine the area and location of the backward buffer section of the buffer 38. Then the controller issues control signals to control the buffer manager 32, the DEMUX device 33, and the audio decoder 36b. The buffer manager 32, according to the control signal issued from the controller 37, retransmits data packets within the backward buffer section to the DEMUX device 33. The DEMUX device 33, according to the control signal issued from the controller 37, filters and outputs the second subtitle stream to the subtitle stream buffer 35c for further processing by the subtitle decoder 36c.

Figure 4:
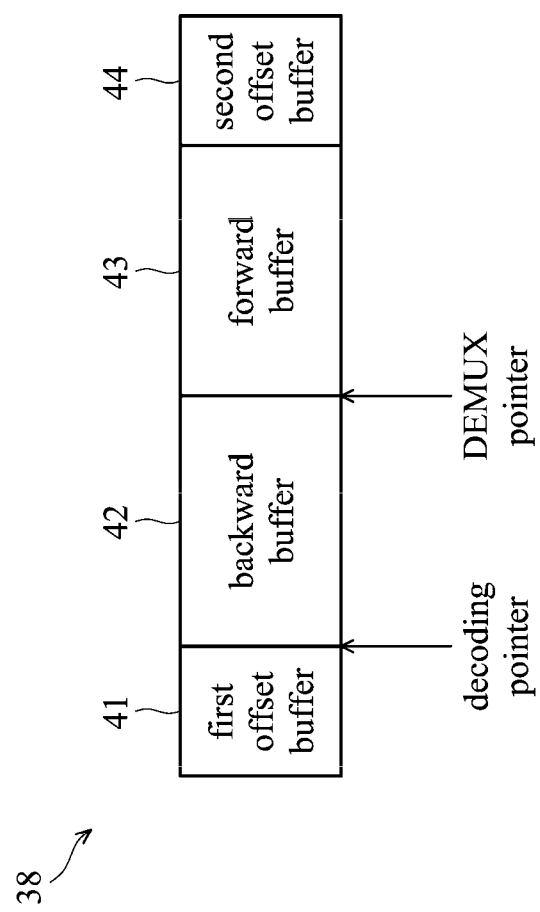
FIG. 4 is a schematic diagram of a buffer according to an embodiment of the invention.

FIG. 4 is a schematic diagram of a buffer 38 according to an embodiment of the invention. The buffer 38 operationally may include four sections, a first offset buffer 41, a backward buffer 42, a forward buffer 43 and a second offset buffer 44. The backward buffer 42 stores data that has been demultiplexed by a demultiplexer, but it has not processed by a post data processing unit, such as the audio decoder 36b. The forward buffer 43 stores the multimedia data stream which is newly received from a multimedia source, wherein the multimedia data stream has still not been demultiplexed by the demultiplexer. The data stored in the first offset buffer 41 is also already processed by the post data processing unit and the size of the first offset buffer 41 is determined according to the processing time period of the demultiplexer and the data processing unit. The data of the second offset buffer 44 is a pre-read temporarily data.

In this embodiment, the size of the first offset buffer 41 may be smaller than the second offset buffer 44. In FIG. 4, it can be found that the backward buffer 42 is determined according to the DEMUX pointer and the decoding pointer. The DEMUX pointer points to a first buffer address of the buffer 38 where stores a first data unit of the multimedia stream. And the first data unit is currently processed by a demultiplexer, such as the DEMUX device 33 in FIG. 3. The decoding pointer points to a second buffer address of the buffer 38 where stores a second data unit of the multimedia stream. And the second data unit is currently processed by the data processing device, such as the audio decoder 36b in FIG. 3. In this embodiment, the buffer is implemented by a ring buffer.

Figure 5:
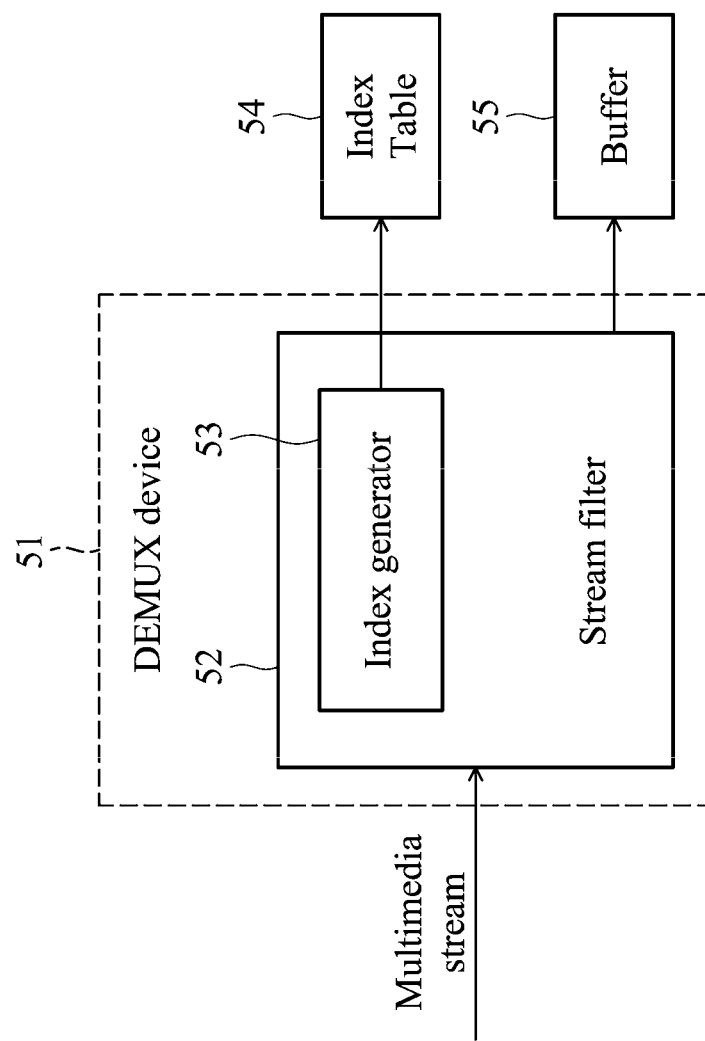
FIG. 5 is a schematic of an embodiment of a DEMUX device according to the invention.

FIG. 5 is a schematic of an embodiment of a DEMUX device according to the invention. The DEMUX device 51 comprises a stream filter 52 and an index generator 53. The index generator 53 generates an index data. The index data may include a time stamp, a stream logic offset, and buffer address information. The time stamp represents a time value corresponding to the data packet decoding time (DTS) and/or presenting time (PTS). The stream logic offset represents an offset value base on the first data packet of the multimedia stream. The buffer address information represents the buffer address of the buffer 38 for storing the data. The stream filter 52 filters the multimedia data stream and outputs the requested data stream to the buffer 55. In one embodiment, the index generator 53 outputs the index data to the index table 54 based on demultiplexed data which filtered by the stream filter 52.

Figure 6:
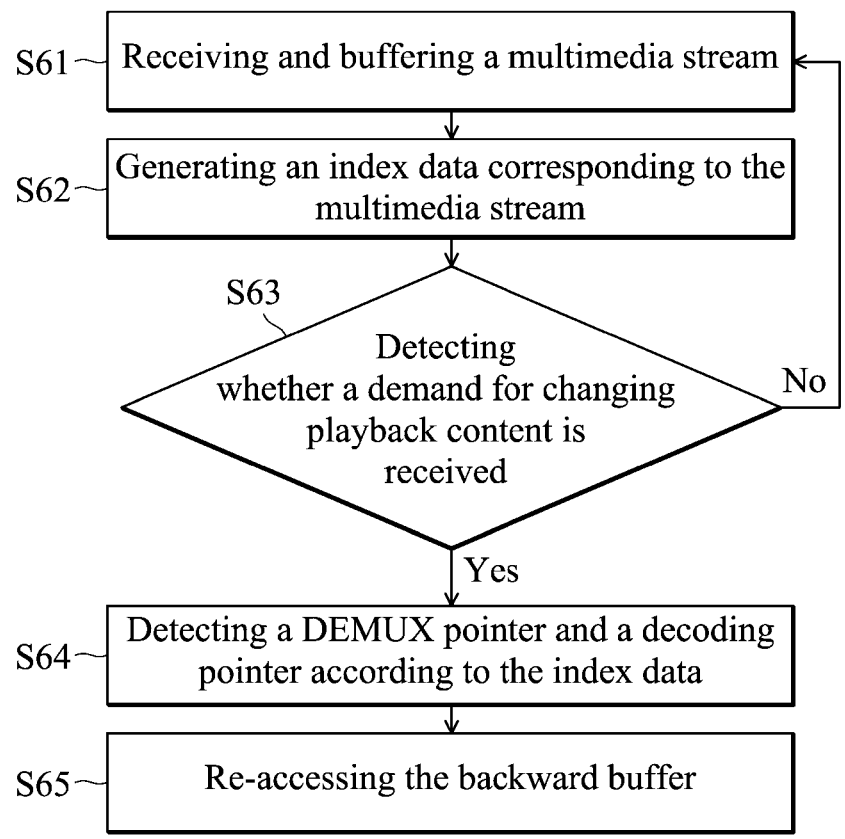
FIG. 6 is a flowchart of an embodiment of a data stream processing method according to the invention.

FIG. 6 is a flowchart of an embodiment of a data stream processing method according to the invention. In step S61, a buffer device receives and buffers a multimedia data stream. The multimedia data stream includes a plurality of data units. In step S62, a demultiplexer accesses the multimedia stream stored in the buffer device and generates an index data corresponding to the data units of the multimedia data stream. The index data contains a time stamp, a stream logic offset and buffer address information. The time stamp represents a time value corresponding to the data packet decoding time (DTS) and/or presenting time (PTS). The DTS and PTS is a data filed in the multimedia stream and is well known to the person of the skill in the art, therefore it will not be discussed hereafter for the sake of brevity. The stream logic offset represents a offset value base on the first data packet of the multimedia stream. The buffer address information represents the buffer address for storing the data packet. The demultiplexer further filters the multimedia data stream and outputs an output stream data together with the index data.

In step S63, the stream buffer device determines whether a demand for changing playback content is received, e.g. audio change, subtitle change, or viewing angle change. If the stream buffer device does not receive the playback demand change, the procedure goes back to step S61. If the determination result in step S63 is yes, the procedure goes to step S64. In step S64, the stream buffer device determines a DEMUX pointer and a decoding pointer according to the index data. The area of the buffer defined between the DEMUX pointer and the decoding pointer is a backward buffer section for storing data packets of the multimedia which has been accessed by the demultiplexer, however, has not been processed by a data processing device. The DEMUX pointer represents a first buffer address of the buffer where stores a first data unit of the multimedia stream. And the first data unit is currently processed by the demultiplexer. The decoding pointer represents a second buffer address of the buffer where stores a second data unit of the multimedia stream. And the second data unit is currently processed by the data processing device. In step S65, the demultiplxer re-accesses the data packets within the backward buffer section. Since the data unit could be kept in the buffer for a period of time, when the user changes the audio settings to select the 5.1 channel sound format, the DEMUX device 12 according to the control signal re-access the data stored in the backward buffer section 13 so that the video data stream and the second audio data stream will be output to the data processing device. With such re-accessing operation, the user demanded audio change operation will be performed quickly and smoothly with a shorter transition time so as to improve the user experience.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A data stream processing apparatus, comprising:
   a buffer device for buffering a multimedia data stream, the multimedia data stream comprises a plurality of data units;
   a demultiplexer accessing the data units of the multimedia data stream in the buffer device, generating an index data corresponding to the data units of the multimedia data stream, and filtering the data units of the multimedia data stream to output a first output data stream;
   a data processor receiving and processing the first output data stream;
   a controller for receiving a demand of changing playback content, generating a control signal, and determining a DEMUX pointer and a decoding pointer according to the index data, so as to determine a backward buffer section of the buffer device according to the DEMUX pointer and the decoding pointer;
   wherein the demultiplexer, according to the control signal, re-accesses and filters the data units stored in the backward buffer section to output a second output data stream; and
   wherein data processor receiving and processing the second output data stream;

wherein the DEMUX pointer represents a first buffer address of the buffer that stores a first data unit of the multimedia stream, and the first data unit is currently processed by the demultiplexer, the decoding pointer represents a second buffer address of the buffer that stores a second data unit of the multimedia stream, and the second data unit is currently processed by the data processor;

wherein the first buffer address and the second buffer address are related to the same physical buffer; and wherein data units stored in the backward buffer have been processed by the demultiplexer and have not been processed by the data processor.

2. The apparatus as claimed in claim 1, wherein the demultiplexer further comprises:
an index generator for receiving the data units of the multimedia data stream and generating the index data; and
a filter for filtering the data units of the multimedia data stream.

3. The apparatus as claimed in claim 2, wherein the index data comprises a time stamp and buffer address information;
wherein the time stamp represents a time value corresponding to the data packet decoding time (DTS) and/or presenting time (PTS), and the buffer address information represents the buffer address for storing the data packet.

4. The apparatus as claimed in claim 2, further comprising an index table that is a corresponding chart of the multimedia data stream and the index data.

5. A data stream processing apparatus, comprising:
a demultiplexer to access and demultiplex a multimedia data stream and output a first data stream; wherein the multimedia data stream comprises a plurality of data units;
a data processor to receive and process the first data stream;
a backward buffer for storing a first portion of multimedia data stream, wherein the data units of the first portion of the multimedia data stream has been accessed by the demultiplexer, but has not been processed by the data processor, and;
if a user demands changing a playback content of the multimedia data stream, the data units stored in the backward buffer are re-transmitted to the demultiplexer for filtering out a second data stream corresponding to the demand;
wherein the backward buffer is determined by a DEMUX pointer and a decoding pointer, wherein the DEMUX pointer represents a first buffer address of the buffer that stores a first data unit of the multimedia stream, and the first data unit is currently processed by the demultiplexer, and the decoding pointer represents a second buffer address of the buffer that stores a second data unit of the multimedia stream, and the second data unit is currently processed by the data processor;
wherein the first buffer address and the second buffer address are related to the same physical backward buffer.

6. The apparatus as claimed in claim 5, wherein the demultiplexer further comprises:
an index generator for receiving the data units of the multimedia data stream and generating the index data; and
a filter for filtering the data units of the multimedia data stream.

7. The apparatus as claimed in claim 6, wherein the index data comprises a time stamp and buffer address information;
wherein the time stamp represents a time value corresponding to the data packet decoding time (DTS) and/or presenting time (PTS), and the buffer address information represents the buffer address for storing the data packet.

8. The apparatus as claimed in claim 6, further comprising an index table that is a corresponding chart of the multimedia data stream and the index data.

9. A data stream processing method comprising:
(a) buffering a multimedia data stream in a buffer, the multimedia data stream comprises a plurality of data units;
(b) accessing the data units of the multimedia data stream in the buffer, and generating an index data corresponding to the data units of the multimedia data stream;
(c) determining whether a demand of changing playback content is received;
(d) if the determination step on step (c) is positive, determining a DEMUX pointer and a decoding pointer according to the index data, so as to determine a backward buffer section of the buffer according to the DEMUX pointer and the decoding pointer; wherein the DEMUX pointer represents a first buffer address of the buffer that stores a first data unit of the multimedia stream, and the first data unit is currently processed by the demultiplexer, and the decoding pointer represents a second buffer address of the buffer that stores a second data unit of the multimedia stream, and the second data unit is currently processed by the data processor; wherein the first buffer address and the second buffer address are related to the same physical backward buffer, and wherein data units stored in the backward buffer have been processed by the demultiplexer and have not been processed by the data processor; and
(e) re-accessing the data units stored in the backward buffer section of the buffer.

10. The method as claimed in claim 9, wherein the index data comprise a time stamp, and buffer address information;
wherein the time stamp represents a time value corresponding to the data packet decoding time (DTS) and/or presenting time (PTS), and the buffer address information represents the buffer address for storing the data packet.

11. The method as claimed in claim 9, wherein the method further comprises:
(f) if the determination step on step (c) is positive, generating a control signal; and
(g) filtering the data units which is re-accessed from the backward buffer section of the buffer according to the control signal.

* * * * *